United States Patent
Tai

(10) Patent No.: US 9,077,768 B2
(45) Date of Patent: Jul. 7, 2015

(54) METHOD AND SYSTEM FOR PROVIDING DIGITAL CONTENTS IN A NETWORK ENVIRONMENT

(71) Applicant: Wistron Corporation, New Taipei (TW)

(72) Inventor: Yeu Tai, New Taipei (TW)

(73) Assignee: WISTRON CORPORATION, New Taipei (TW)

( * ) Notice: Subject to any disclaimer, the term of this patent is extended or adjusted under 35 U.S.C. 154(b) by 276 days.

(21) Appl. No.: 13/769,857

(22) Filed: Feb. 19, 2013

(65) Prior Publication Data

US 2014/0074910 A1 Mar. 13, 2014

(30) Foreign Application Priority Data

Sep. 12, 2012 (TW) .............................. 101133238 A

(51) Int. Cl.
*H04L 29/08* (2006.01)
*G06F 3/06* (2006.01)
*H04L 12/865* (2013.01)

(52) U.S. Cl.
CPC .............. *H04L 67/32* (2013.01); *G06F 3/0659* (2013.01); *H04L 47/6275* (2013.01)

(58) Field of Classification Search
CPC ....... G06F 3/0659; G06F 9/50; G06F 9/5005; G06F 2209/5021; G06F 2209/548; H04L 47/50; H04L 47/622; H04L 47/6275; H04L 67/32; H04L 67/322
See application file for complete search history.

(56) References Cited

U.S. PATENT DOCUMENTS

| | | | |
|---|---|---|---|
| 6,594,264 B1 * | 7/2003 | Lin et al. ................... | 370/395.42 |
| 6,694,388 B1 * | 2/2004 | Schzukin et al. ............... | 710/52 |
| 2006/0200456 A1 * | 9/2006 | Zohar et al. ........................ | 707/4 |
| 2009/0307519 A1 * | 12/2009 | Hyatt ............................. | 713/502 |
| 2010/0100525 A1 * | 4/2010 | Huang .......................... | 707/609 |
| 2010/0228598 A1 | 9/2010 | Seuken et al. | |
| 2011/0314476 A1 * | 12/2011 | Choi ............................. | 718/103 |
| 2012/0250635 A1 * | 10/2012 | Gao .............................. | 370/329 |

* cited by examiner

*Primary Examiner* — Brian J Gillis
*Assistant Examiner* — Gil H. Lee
(74) *Attorney, Agent, or Firm* — McClure, Qualey & Rodack, LLP

(57) ABSTRACT

Method for providing digital contents in a network environment in an embodiment includes the following. In a server, the digital content request is checked for its priority. Whether a queue is full is checked. If the queue is not full, the digital content request is added to the queue. If the digital content request is not of a high priority and the queue is full, a communication link to a client device corresponding to the digital content request is disconnected. If the digital content request is of the high priority and the queue is full, the digital content request is added to an additional queue appended to the queue. With respect to a first request, a digital content required by the first request is provided to a client device corresponding to the first request. The providing step is repeated for another request obtained from the queue.

18 Claims, 4 Drawing Sheets

METHOD AND SYSTEM FOR PROVIDING DIGITAL CONTENTS IN A NETWORK ENVIRONMENT

This application claims the benefit of Taiwan application Serial No. 101133238, filed Sep. 12, 2012, the subject matter of which is incorporated herein by reference.

BACKGROUND OF THE INVENTION

1. Field of the Invention

The invention relates in general to a method and a system for providing digital contents in a network environment.

2. Description of the Related Art

Digital classroom is a current trend in teaching. However, when computational resource and cost are taken into consideration, the configuration of the system satisfying the use of class members still face some technical problems. For example, some network environments in the classroom may still be subjected to bandwidth restriction, and when the class members download a large volume of data with client devices at very short time intervals, the server may be congested and the users may have unpleasant experience of use.

SUMMARY OF THE INVENTION

The invention is directed to a method for providing digital contents in a network environment and a system therefor.

According to one embodiment of the invention, a method for providing digital contents in a network environment is disclosed. The embodiment includes the following steps. In a server, the digital content request is checked for its priority in response to a digital content request by a processing unit of the server. Whether a queue is full is checked. If the queue is not full, then the digital content request is added to the queue. If the digital content request is not of a high priority and the queue is full, then a communication link to a client device corresponding to the digital content request is disconnected. If the digital content request is of the high priority and the queue is full, then the digital content request is added to an additional queue appended to the queue. With respect to a first request, a digital content required by the first request is provided to a client device corresponding to the first request through a network unit of the server. With respect to another request obtained from the queue, a digital content required by the another request is provided to a corresponding client device through the network unit of the server.

According to another embodiment of the invention, a computing device readable information storage medium having stored programming code, which when executed by an electronic device, causes the electronic device to perform the steps of the method for providing digital contents in a network environment according to the above embodiment.

According to another embodiment of the invention, a system for providing digital contents in a network environment is disclosed. The embodiment includes: a server including a memory unit, a network unit, and a processing unit. In response to a digital content request, the processing unit is operable to check the digital content request for its priority and to check whether a queue is full. If the queue is not full, then the processing unit is operable to add the digital content request to the queue. If the digital content request is not of a high priority and the queue is full, then the processing unit is operable to control the network unit to disconnect a communication link to a client device corresponding to the digital content request. If the digital content request is of the high priority and the queue is full, then the processing unit is operable to add the digital content request to an additional queue appended to the queue. With respect to a first request, the processing unit is operable to provide a digital content required by the first request to a client device corresponding to the first request through the network unit of the server. The processing unit is operable to obtain another request from the queue and to provide a digital content required by the another request to a corresponding client device through the network unit of the server.

The above and other aspects of the invention will become better understood with regard to the following detailed description of the preferred but non-limiting embodiment(s). The following description is made with reference to the accompanying drawings.

DETAILED DESCRIPTION OF THE INVENTION

A number of embodiments of a method and a system for providing digital contents in a network environment are disclosed below. The network environment is realized by such as mobile network, local network, wireless network, Internet or any combination thereof. Examples of digital contents include but are not limited to text, picture, hypertext, application program (such as App) or multi-media files.

Figure 1:
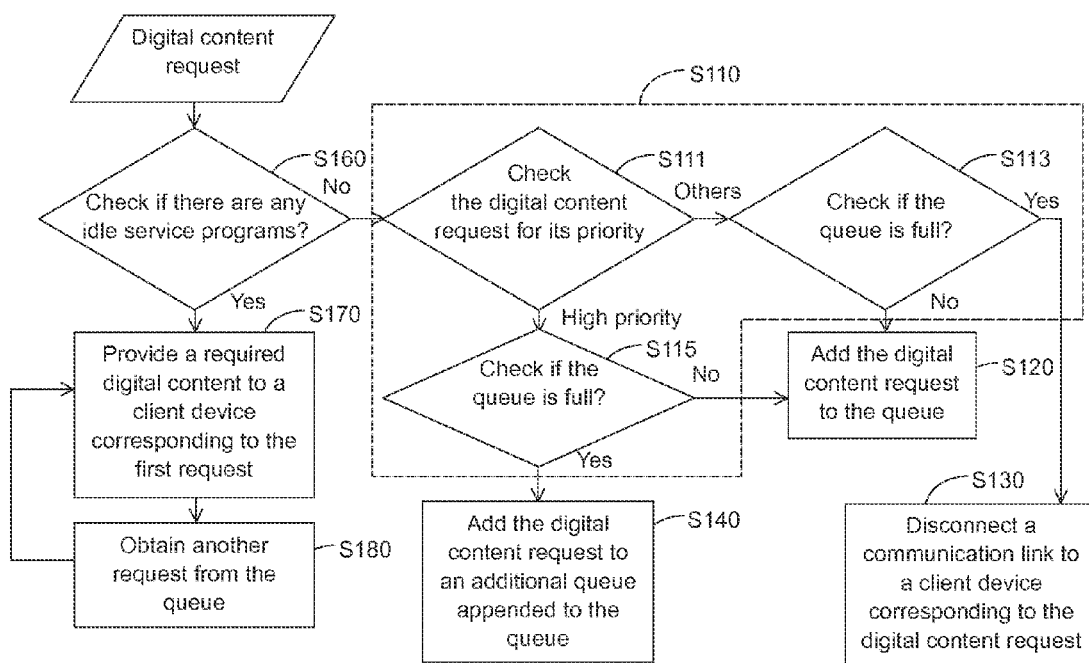
FIG. 1 shows a flowchart of some embodiments of a method for providing digital contents in a network environment.
Figure 2:
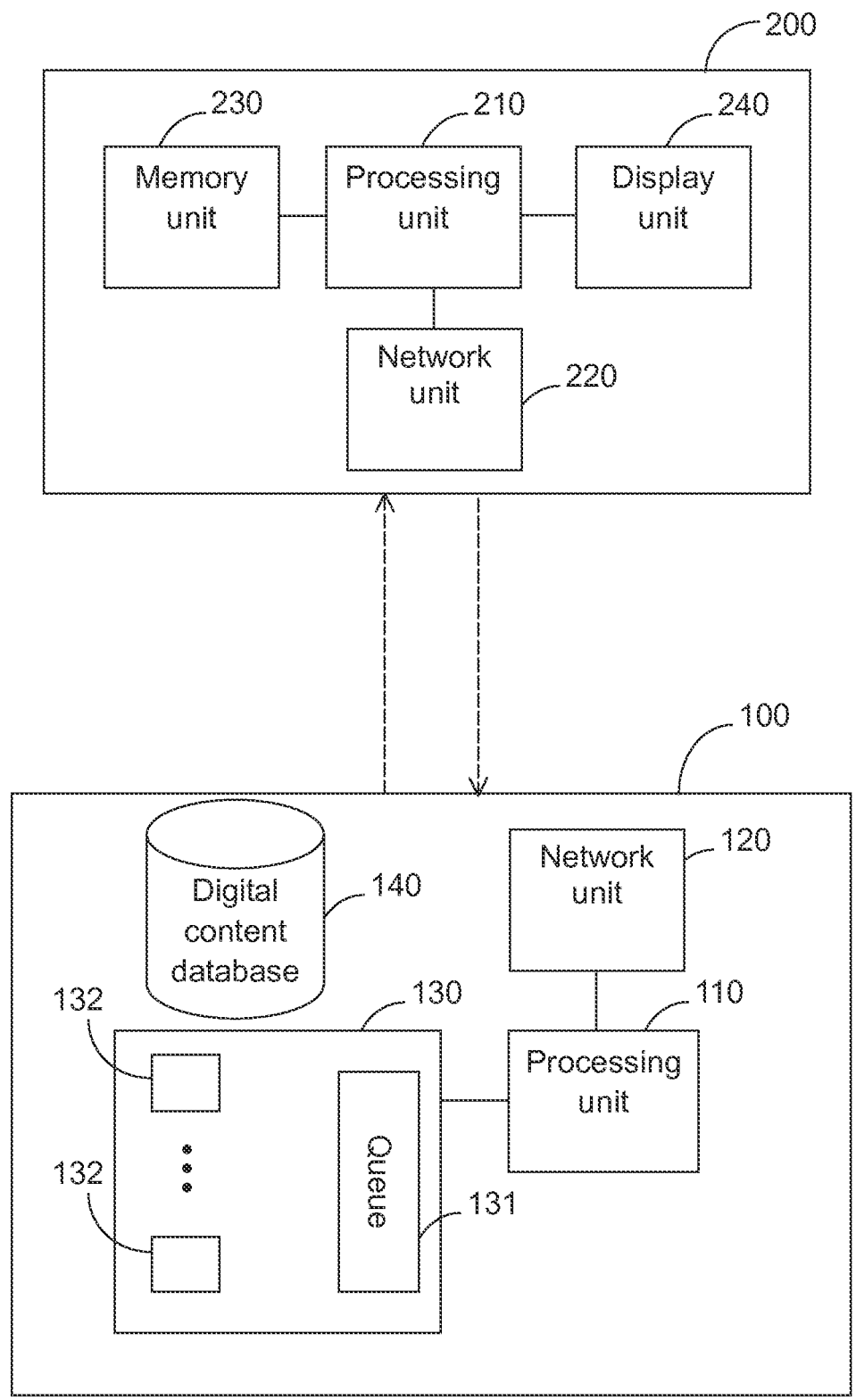
FIG. 2 shows a block diagram of an embodiment of a system for providing digital contents in a network environment.

Referring to FIG. 1 a flowchart of some embodiments of a method for providing digital contents in a network environment is shown. The method can be used in an embodiment of a system for providing digital contents to class members in a network environment for teaching, as shown in FIG. 2. As indicated in FIG. 2, a server 100 provides a digital content to a client device 200 such as a computing device like tablet computer, smart phone, notebook computer or desktop computer. In some practical examples as indicated in FIG. 3, in a network environment for teaching, the system of FIG. 2 is used for providing digital contents to a number of class members, who use client devices 301-317 for presenting digital content requests to the server 100 to download one or more digital contents for the use of the class.

Figure 3:
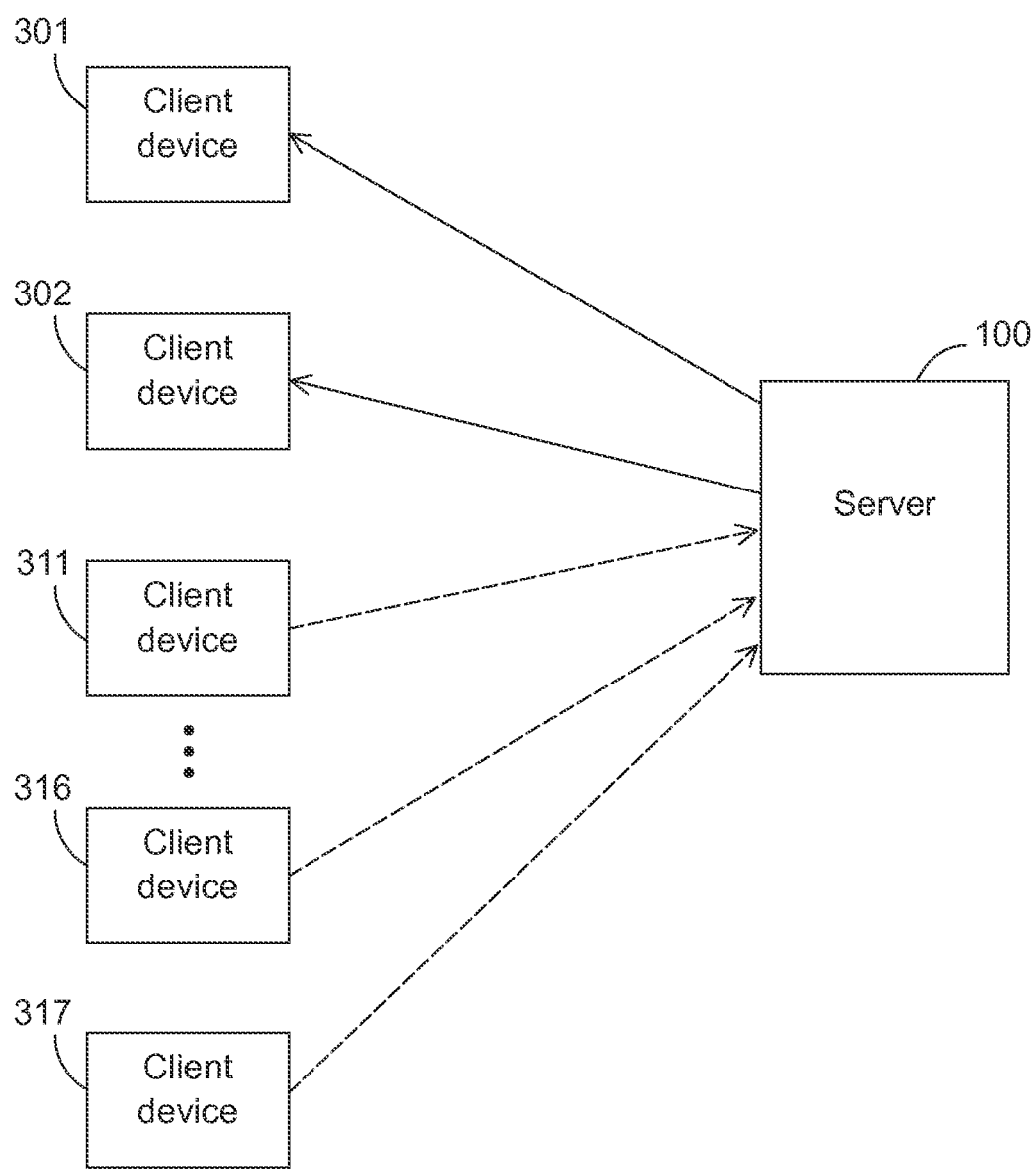
FIG. 3 shows a system of FIG. 2 for providing digital contents to class members in a network environment for teaching.

In the example of FIG. 3, if the class members need to download the same digital content for a class or need to download different digital contents for different classes, they may present a number of digital content requests to the server 100 at the same time or within short time intervals. Due to the bandwidth restriction in a certain network environment (such as wireless local network), network congestion may occur. Since the server 100 needs to concurrently process the links to many client devices and share the bandwidth with many users, the server 100 needs to spend more time in downloading for all requests. If the link between the server 100 and some of the client devices is disconnected during the downloading process due to timeout, the downloading process has to start again, making the congestion even worse.

Referring to FIG. 1, a flowchart of some embodiments of a method for providing digital contents in a network environment is shown. Referring to FIG. 2, the method can be used in the server 100. The present embodiment of the method can be applied in and illustrated by the server 100, but is not limited to the server 100. The server 100, for example, includes a processing unit 110, a network unit 120, and a memory unit. The memory unit, for example, includes a memory 130 and a digital content database 140. For example, the processing unit 110 uses at least one queue 131 and at least two service programs 132 (e.g., implemented as threads or application programs) in the memory 130 to manage the digital content requests. For example, at least two service programs 132 receive requests from the queue 131 and then provide corresponding digital content(s) from digital content database 140 to the client device through the network unit 120. The digital content database 140 is capable of storing at least one digital content. In addition, the digital content database 140 may be implemented in the server 100 or in a storage space or server external to the server 100. In addition, the digital content request may have at least two priority levels such as an ordinary priority (non-high priority) and a high priority.

The method of the present embodiment includes the following steps. As indicated in step S110, in the server 100, in response to a digital content request, the digital content request is checked for its priority, and whether a queue is full is checked by the processing unit 110 (such as a single- or multi-core processor) of the server 100. After the checking step S110, the processing unit 110 of the server 100 confirms whether the queue is full and/or whether the digital content request is of a high priority. Based on the checking results, the processing unit 110 determines how to process the digital content request.

As indicated in step S120, if the queue is not full, then the digital content request is added to the queue. That is, the digital content request is added to the queue no matter what priority the digital content request has.

As indicated in step S130, if the digital content request is not of a high priority and the queue is full, then a communication link to a client device corresponding to the digital content request is disconnected. Referring to FIG. 3, for example, while the server 100 is providing one or more digital contents to the client devices 301 and 302, the server 100 receives digital content requests from the client devices 311-316 and thus adds these requests to the queue, leading to the queue being full. If another client device 317 or other client device presents a digital content request, then the server 100 makes the communication link between the client device 317 and the server 100 disconnected. Thus, the client device 317 does not occupy the resource of the communication link (such as bandwidth) and further avoids wasting its own computational resource on waiting. Moreover, after the communication link is disconnected, the client device 317 can be set to present the request again after a time interval.

Figure 4:
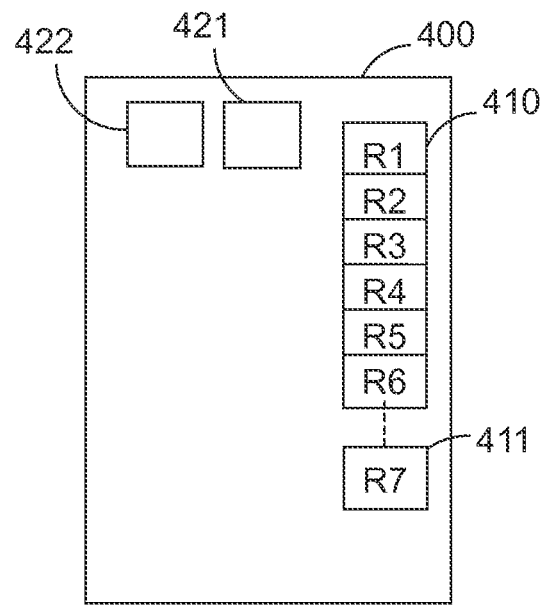
FIG. 4 shows a queue scheduling for the embodiment of FIG. 3.

As indicated in step S140, if the digital content request is of the high priority and the queue is full, then the digital content request is added to an additional queue appended to the queue. Referring to FIG. 4, an example of the above queue 131 is illustrated. In the memory 400, a queue 410 is implemented in a linear manner with a length of 6, and two service programs 421 and 422 are employed. Under the circumstance as indicated in step S140, the queue 410 already has 6 requests R1-R6, and the request R7 is of a high priority. The processing unit 110 of the server 100 then makes an additional queue 411 appended to the queue 410. The queue 411 may have one or many nodes, and only those high priority requests satisfying the conditions of step S140 can be added to the queue 411. If the queue 410 becomes not full afterward, the incoming requests are again added to the queue 410. Thus, the server 100 may make the client device sending high priority request receive the requested digital content earlier.

In step S170, with respect to a first request (such as the currently received request or the request obtained from the queue 131), the processing unit 110 provides a digital content required by the first request to a client device corresponding to the first request through the network unit 120 of the server 100.

In step S180, another request (such as replacing the first request) is obtained from the queue 131, and the providing step S170 is repeated.

In the above embodiments, the disconnecting of the communication link as indicated in step S130 and the adding of an additional queue as indicated in step S140 facilitate the server 100 to effectively process digital content requests of multiple client devices for downloading under the bandwidth restriction in a network environment (such as wireless local network or cabled network). As indicated in the example of FIG. 3, in the network environment for teaching (a many-to-one network environment, such as classroom, seminar, and staff training), the method of the above embodiments achieves reasonable use of network bandwidth and computational resource, and therefore reduces the occurrence of congestion.

Step S110 can be implemented in different ways. In the example illustrated in step S111 of FIG. 1, the digital content request is checked for its priority, for example, whether the digital content request is of a high priority is checked. If the digital content request is not of the high priority (that is, other circumstance), then as indicated in step S113, whether the queue is full is checked. If it is determined that the queue is not full, then the method proceeds to step S120; otherwise, the method proceeds to step S130. In step S111, if it is determined that the digital content request is of the high priority, then the method proceeds to step S115, whether the queue is full is checked. If it is determined that the digital content request is not of the high priority, then the method proceeds to step S120; otherwise, the method proceeds to step S140. The step S110 can also be implemented in a manner that the step of checking whether the queue is full comes before the step of checking whether the digital content request is of the high priority. Hence, step S110 can be implemented in different ways, and is not subjected to the sequence of sub-steps in the above example. Therefore, any methods capable of implementing step S110 so as to proceed to steps S120-S130 can be used in the present embodiment.

Referring to FIG. 1, the method for providing digital contents in a network can be implemented in another embodiment including the following steps. As indicated in step S160, in the server 100, whether there are any idle service programs among a plurality of service programs (such as service programs 132) of the server 100 is checked by the processing unit 110 of the server 100 in response to the digital content request. If there are idle service programs among the service programs, then an idle service program among the service programs is arranged to execute the providing step S170 in response to the digital content request. That is, the first request in the above step S170 is the digital content request. It is implied in the embodiment that when there are idle service programs available, the server 100 enables the idle service programs to process the currently received requests without having to check whether the queue is full and subsequently adding the request to the queue as indicated in step S110.

Therefore, if there are not any idle service programs available, the method proceeds to step S110.

Therefore, in another embodiment, step S170 of the method for providing digital contents in a network environment may be implemented in a manner that the digital content request is obtained from the queue for processing.

In some other embodiments, the method for providing digital contents in a network environment may further set priority for the digital content request in the client device or the server. As indicated in step S210 of FIG. 5, whether the digital content request satisfies a condition defined according to a form is determined. If the digital content request satisfies the defined condition, then the method proceeds to step S220, the priority of the digital content request is upgraded to high priority; otherwise, other way of processing is allowed. For example, the form includes event identification data and a time corresponding to the event identification data. When used in the teaching environment as indicated FIG. 3, the form can be implemented as a time table, such as Table 1, in which the class number (or class name) can be regarded as the event identification data corresponding to the starting time of the class.

TABLE 1

| Class | Time |
| --- | --- |
| Chinese (C008) | 2012 Aug. 24, 10:00 |
| English (C003) | 2012 Aug. 24, 11:00 |
| Mathematics (C005) | 2012 Aug. 24, 13:00 |

Figure 5:
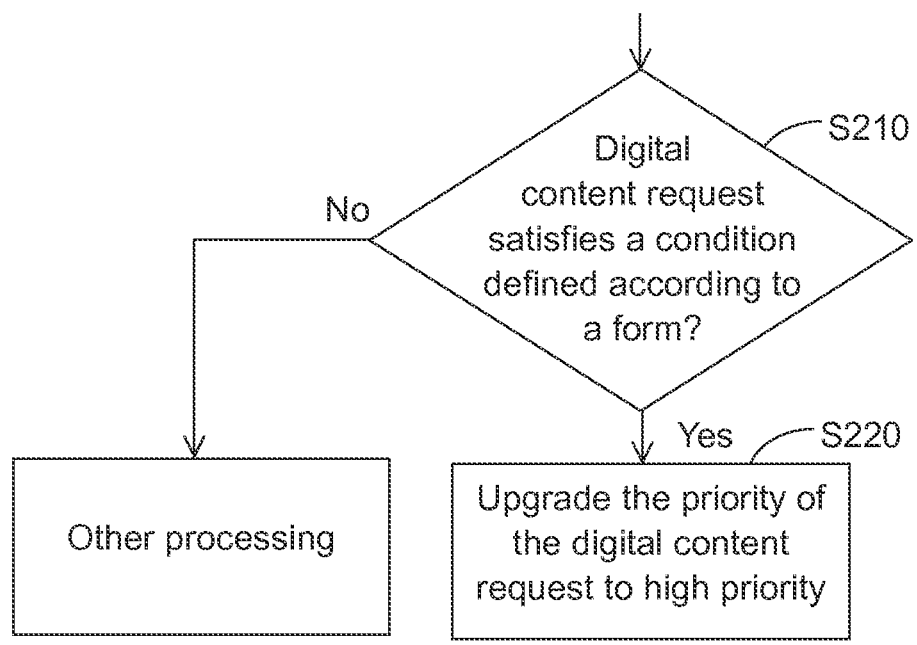
FIG. 5 shows another embodiment of the method for providing digital contents in a network environment in flowchart form.

According to different embodiments of FIG. 1, the steps of FIG. 5 can be executed prior to the step of checking the digital content request for its priority (such as step S111). Thus, the server 100 may determine whether to upgrade the priority of the received digital content request according to the condition of the form. For example, whether the class will start soon can be set as a condition. Examples of such condition include whether an event represented by event identification data corresponding to the digital content required by a digital content request (such as course, seminar, conference, or staff training) will occur within a time threshold (such as 1 hour). In the example of FIG. 3, suppose the request sent from the client device 317 is of an ordinary priority and requests for a digital content (such as requesting for a video file and text file regarding a story of the Chinese class). If the server 100 implementing the present embodiment executes step S210 and confirms that the Chinese class will start within 1 hour, then the server 100 automatically upgrades the request to a high priority request, and adds the request to the queue. Thus, the user of the client device 317 can obtain the requested digital content earlier.

In addition, the steps of FIG. 5 may be implemented in the client device. Referring to FIG. 2, the client device 200 includes a processing unit 210, a network unit 220, a memory unit 230, and a display unit 240. In addition to controlling the operation of the client device 200, the processing unit 210 of the client device 200 may further control the network unit 220 to send a digital content request for downloading a digital content to the memory unit 230. The processing unit 210 determines whether the digital content request satisfies a condition defined according to a form. If the digital content request satisfies the defined condition, then the priority of the digital content request is upgraded to high priority. In an embodiment, the client device 200 may obtain the form from the server 100 or other sources, and set the priority of the digital content request in the client device 200. In a practical example, an application program may be implemented in the client device for downloading the form (such as the time table), and the application program further determines whether to present a request for downloading the digital content and determines the priority for the request.

In addition, a computer or computing device readable information storage medium is disclosed in other embodiments, which stores program code or one or many program modules. The program code, when executed, may implement the steps of the embodiments of the above method for providing digital contents in a network environment, such as the steps implemented in the server and/or the client device. The embodiments of readable information storage media are such as but not limited to: optical information storage medium, magnetic data storage medium, or memory such as memory cards, firmware, ROM, RAM, or programmable microcontroller built-in memory.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures

What is claimed is:

1. A method for providing digital contents in a network environment, the method comprising:
    in a server, in response to a digital content request, by a processing unit of the server:
    checking the digital content request for its priority;
    checking whether a queue is full;
    adding the digital content request to the queue only when the queue is not full;
    disconnecting a communication link to a client device corresponding to the digital content request if the digital content request is not of a high priority and the queue is full;
    adding the digital content request to an additional queue, after appending the additional queue to the queue, only when the digital content request is of the high priority and the queue is full;
    with respect to a first request, providing a digital content required by the first request to a client device corresponding to the first request through a network unit of the server;
    with respect to another request obtained from the queue, providing a digital content required by the another request to a corresponding client device through the network unit of the server.

2. The method for providing digital contents in a network environment according to claim 1, further comprising:
    in the server, in response to the digital content request, by the processing unit of the server:
    checking whether there are any idle service programs among a plurality of service programs of the server;
    arranging an idle service program of the service programs to execute the providing step with respect to the digital content request if there are idle service programs among the service programs, wherein the first request is the digital content request.

3. The method for providing digital contents in a network environment according to claim 2, wherein if there are not any idle service programs among the service programs, then the step of checking the digital content request for its priority is executed.

4. The method for providing digital contents in a network environment according to claim 1, further comprising:
in the server, in response to the digital content request, by the processing unit:
determining whether the digital content request satisfies a condition defined according to a form and if so, then the priority of the digital content request is upgraded to high priority.

5. The method for providing digital contents in a network environment according to claim 4, wherein the form includes event identification data and a time corresponding to the event identification data.

6. The method for providing digital contents in a network environment according to claim 5, wherein in the determination step, the condition includes whether an event represented by the event identification data corresponding to the digital content required by the digital content request occurs within a time threshold.

7. The method for providing digital contents in a network environment according to claim 1, further comprising:
in a client device:
determining whether a digital content request satisfies a condition defined according to a form: if so, the priority of the digital content request is upgraded to high priority; and
sending the digital content request to the server.

8. The method for providing digital contents in a network environment according to claim 7, wherein the form includes event identification data and a time corresponding to the event identification data.

9. The method for providing digital contents in a network environment according to claim 8, wherein in the client device, the condition includes whether an event represented by the event identification data corresponding to the digital content required by the digital content request occurs within a time threshold.

10. A non-transitory computer readable information storage medium having stored program code, which when executed by a computer, causes the computer to perform the steps of the method for providing digital contents in a network environment according to claim 1.

11. A system for providing digital contents in a network environment, comprising:
a server, comprising:
a memory unit;
a network unit;
a processing unit, in response to a digital content request, operable to check the digital content request for its priority and to check whether a queue is full, wherein only when the queue is not full, then the processing unit is operable to add the digital content request to the queue; if the digital content request is not of a high priority and the queue is full, then the processing unit is operable to control the network unit to disconnect a communication link to a client device corresponding to the digital content request; only when the digital content request is of the high priority and the queue is full, then the processing unit is operable to add the digital content request to an additional queue, after the additional queue is appended to the queue;
wherein with respect to a first request, the processing unit is operable to provide a digital content required by the first request to a client device corresponding to the first request through the network unit of the server, and the processing unit is operable to obtain another request from the queue and to provide a digital content required by the another request to a corresponding client device through the network unit of the server.

12. The system for providing digital contents in a network environment according to claim 11, wherein in response to the digital content request, the processing unit of the server is operable to:
check whether there are any idle service programs among a plurality of service programs of the server;
arrange, if there are idle service programs among the service programs, an idle service program of the service programs to provide, with respect to the digital content request, the digital content, wherein the first request is the digital content request.

13. The system for providing digital contents in a network environment according to claim 11, wherein in response to the digital content request, the processing unit of the server is operable to:
determine whether the digital content request satisfies a condition defined according to a form; and
if so, then upgrade the priority of the digital content request to high priority.

14. The system for providing digital contents in a network environment according to claim 13, wherein the form includes event identification data and a time corresponding to the event identification data.

15. The system for providing digital contents in a network environment according to claim 14, wherein the condition includes whether an event represented by the event identification data corresponding to the digital content required by the digital content request occurs within a time threshold.

16. The system for providing digital contents in a network environment according to claim 11, further comprising:
a client device, comprising:
a memory unit;
a display unit;
a network unit;
a processing unit operable to control the network unit to send a digital content request to download a digital content to the memory unit, wherein the processing unit is operable to determine whether the digital content request satisfies a condition defined according to a form; and if so, to upgrade the priority of the digital content request to high priority.

17. The system for providing digital contents in a network environment according to claim 16, wherein the form includes event identification data and a time corresponding to the event identification data.

18. The system for providing digital contents in a network environment according to claim 17, wherein in the client device, the condition includes whether an event represented by the event identification data corresponding to the digital content required by the digital content request occurs within a time threshold.

* * * * *